(No Model.)
D. S. McELROY.
ELECTRO MAGNETIC CAR BRAKE.
No. 420,693. Patented Feb. 4, 1890.
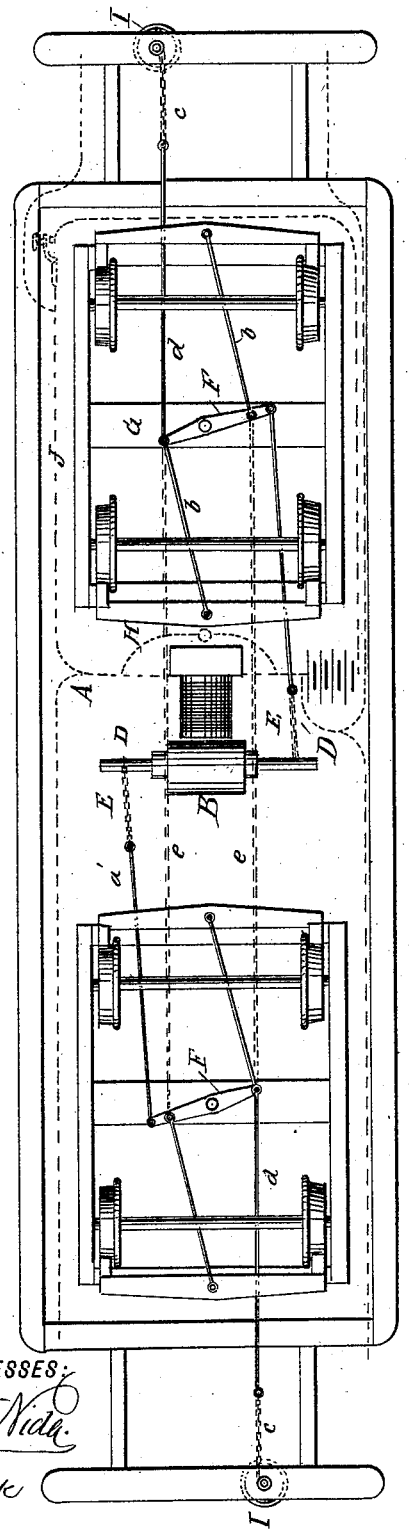
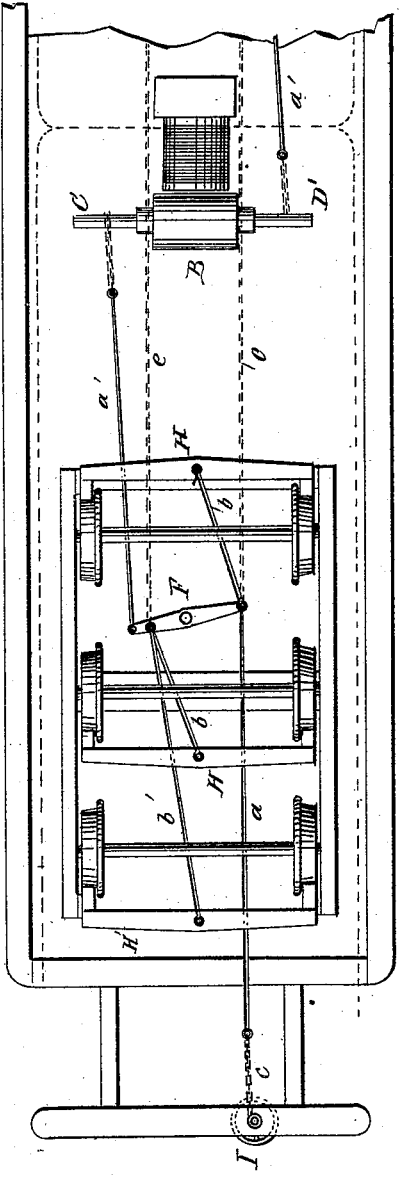
WITNESSES:
INVENTOR:
D. S. McElroy
BY Munn &Co
ATTORNEYS.
N. PETERS, Photo-Lithographer, Washington, D. C.

UNITED STATES PATENT OFFICE.

DANIEL S. McELROY, OF NEW YORK, N. Y.

ELECTRO-MAGNETIC CAR-BRAKE.

SPECIFICATION forming part of Letters Patent No. 420,693, dated February 4, 1890.

Application filed June 29, 1889. Serial No. 316,004. (No model.)

*To all whom it may concern:*

Be it known that I, DANIEL S. MCELROY, of New York, in the county and State of New York, have invented a new and Improved Electro-Magnetic Car-Brake, of which the following is a specification, reference being had to the annexed drawings, forming a part thereof, in which—

Figure 1 is an inverted plan view of my improved car-brake as applied to cars having four-wheeled trucks, and Fig. 2 is an inverted plan view of an electro-magnetic car-brake applied to six-wheeled trucks.

Similar letters of reference indicate corresponding parts in both views.

The object of my invention is to provide a simple and effective car-brake which may be operated by an electric motor carried by the car.

My invention consists in the combination, with a car and ordinary car-brakes, of an electric motor adapted to operate the car-brakes without interfering with the action of the hand-brakes.

To the bottom of the car A is attached an electric motor B, of any approved construction. The armature-shaft C of the motor extends at opposite ends, forming windlasses D D', to which are attached the chains E E', and the said chains E E' are connected with rods $a$ $a'$, which are pivoted to brake-levers F. The said brake-levers F are fulcrumed on the timbers G of the car-trucks, and they are connected by rods $b$ with the brake-beams H.

An ordinary hand-car-brake windlass is provided at the platform at either end of the car in the usual way, and the said windlass is arranged to wind a chain $c$, which is connected by a rod $d$ with the end of the lever F. Opposite ends of the levers F are connected by chains or cables $e$, which cause both of the said levers to move in unison, so that when the car-brake is applied at one end of the car it will be applied in the same manner at the opposite end of the car.

The ends of the armature-shaft of the motor B are arranged to wind two chains simultaneously, but should one of the chains be broken or become disconnected the other chain will apply the brakes to both ends of the car by virtue of the connection of the brake-levers F by the chains or cables $e$.

An electric conductor J extends through the car and is connected with an electric generator or a storage-battery on the locomotive or tender, and when the car to which the brake is attached is provided with a storage-battery for illuminating purposes the battery is connected with the conductor J, so that whenever the circuit of the motor is closed its armature will revolve and wind the chains $d$ $e$, thus applying the brakes. When the current is broken, the armature of the motor being released, the springs attached to the ordinary brake mechanism release the brake and turn the armature in a reverse direction.

It will be seen that the electro-magnetic brake thus described does not interfere in any way with the action of the hand-brake.

In the brake shown in Fig. 2 the car is provided with an additional axle and pair of wheels, and is furnished with an auxiliary brake-beam H' for applying the brakes to the additional wheels, the said brake H' being connected to the lever F by a rod $f'$, and being operated in the same manner as the other brake-beams.

Having thus described my invention, I claim as new and desire to secure by Letters Patent—

In an electric car-brake, the combination of the electric motor B, provided on opposite sides thereof with windlasses D D', the chains E, attached to the said windlasses, the brake-rods $a$ $a'$, brake-levers F, connecting-chains $e$ $e'$, the hand-brakes I, the rods $d$, and chains $c$, connecting the hand-brakes with the levers F, substantially as specified.

DANIEL S. McELROY.

Witnesses:
GEO. M. HOPKINS,
EDGAR TATE.